Inventor:
Kurt Laas.
By [signature] Atty.

Nov. 14, 1961 K. LAAS 3,009,021

CIRCUIT ARRANGEMENT FOR TELEPHONE SYSTEMS COMPRISING MARKERS FOR CONTROLLING THE SETTING OF SWITCHES

Filed March 4, 1959 5 Sheets-Sheet 2

Inventor:
Kurt Laas.

By [signature] Atty.

Nov. 14, 1961 K. LAAS 3,009,021

CIRCUIT ARRANGEMENT FOR TELEPHONE SYSTEMS COMPRISING MARKERS FOR CONTROLLING THE SETTING OF SWITCHES

Filed March 4, 1959 5 Sheets-Sheet 3

Inventor:
Kurt Laas.
By: [signature] Atty

Nov. 14, 1961 K. LAAS 3,009,021

CIRCUIT ARRANGEMENT FOR TELEPHONE SYSTEMS COMPRISING MARKERS FOR CONTROLLING THE SETTING OF SWITCHES

Filed March 4, 1959 5 Sheets-Sheet 4

Inventor:
Kurt Laas.
By [signature] Atty.

Nov. 14, 1961 K. LAAS 3,009,021

CIRCUIT ARRANGEMENT FOR TELEPHONE SYSTEMS COMPRISING MARKERS FOR CONTROLLING THE SETTING OF SWITCHES

Filed March 4, 1959 5 Sheets-Sheet 5

Inventor.
Kurt Laas.
By. [signature] Atty.

United States Patent Office 3,009,021

Patented Nov. 14, 1961

3,009,021
CIRCUIT ARRANGEMENT FOR TELEPHONE SYSTEMS COMPRISING MARKERS FOR CONTROLLING THE SETTING OF SWITCHES

Kurt Laas, Munich, Germany, assignor to Siemens and Halske Aktiengesellschaft Berlin and Munich, a corporation of Germany Filed Mar. 4, 1959, Ser. No. 797,281
Claims priority, application Germany Mar. 10, 1958
9 Claims. (Cl. 179—18)

Figure 1A:
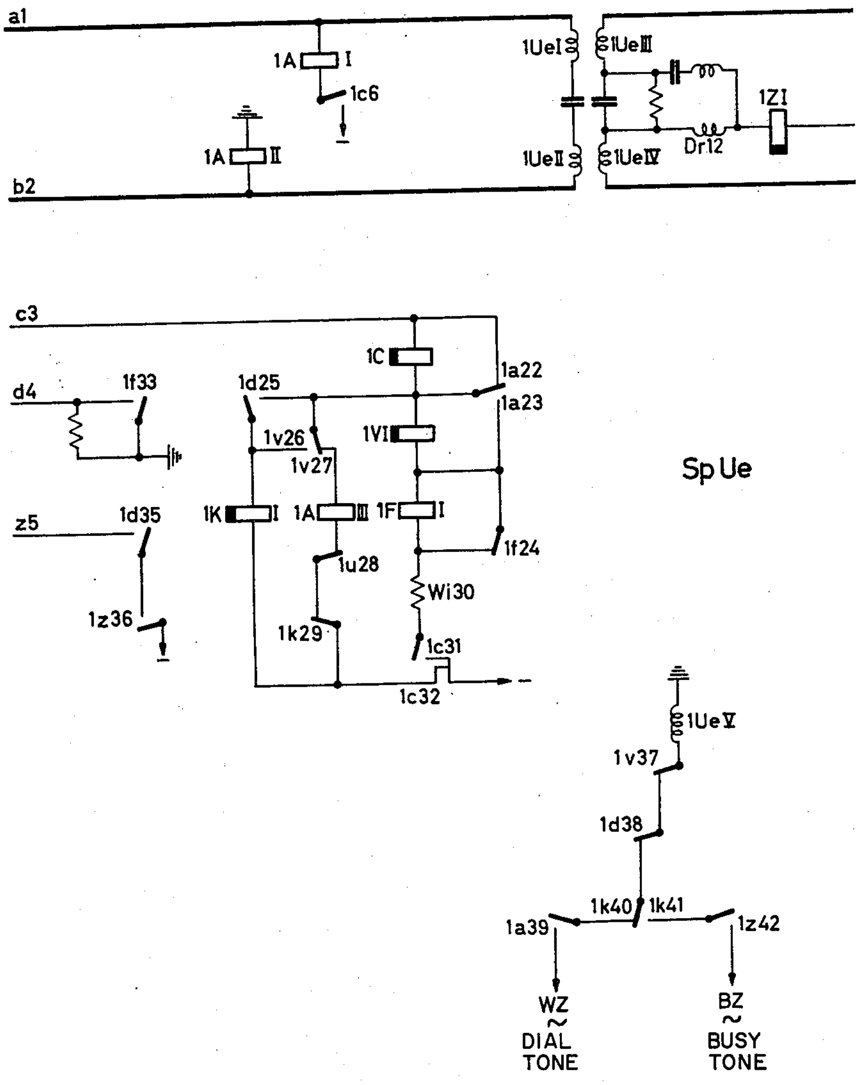

This invention is concerned with a switching arrangement for telephone systems comprising markers for controlling the setting of switches.

Telephone systems having switches which are set in the individual selection stages by individual marker devices or marker devices common to a group of switches are already known. Such a telephone system has several advantages—non-decade selectors having access to a large number of trunks or lines can be rapidly set since the conversion of the decade numbers received or of the corresponding trains or series of number pulses takes place in the storage marker. The marking of groups of lines in selectors which are constructed as decade selectors and in particular high-speed rotary selectors makes it possible to form non-decade groups of bank contacts of different size, without necessitating reduction of the speed of operation of the selector. Furthermore, when using common markers, the relay sets for the selectors can be kept small, since a large part of the relays necessary for the different switching operations can be provided in the marker.

However, common markers which are not always immediately available for the extension of a call, make it necessary to provide, at least at the beginning of the connection path, storage devices for the impulse series, which may also be individually or jointly associated with the connection paths. Storing devices which are associated jointly with the connection paths are economical only in the case of large central exchanges, since central storage devices must be of considerable size. For smaller exchanges, having a relatively small number of subscribers' lines, individual storage devices are more economical, particularly if electromechanical storage devices of economical design or construction are used.

In order to control the individual markers from the storage device, various criteria are required such as the demand-signal for the individual marker, furthermore the criterion, for the hunting and stopping of the connecting switch for the individual marker, for and on the connection path seized and finally, a criterion for the transmission of the trains of current pulses which are to be transmitted from the storage device to the marker. For the transmission of these criteria, the invention provides paths which make use merely of one and the same conductor, preferably a line conductor of the seized connection path, thus providing the advantage that the other line conductor remains free for the transmission of signalling, such as end of dialing, subscriber's busy signal, subscriber's answering signal. The circuits are thereby made considerably simpler and easier to supervise.

Another feature of the invention makes it possible, in a telephone system in which the signal proceeding from the storage device for the connecting of a subsequent marker, the stopping circuit for the switch which connects the marker and the train of current pulses to be transmitted, extend over one and the same line conductor, to transmit still a further criterion over this conductor. An additional criterion is necessary when a connection is to be made from a telephone exchange of such system to a telephone exchange of another system in connection with which a different type of impulse transmission is employed, for instance ground impulses instead of current interruptions. The switching in the storage device, to the type of current pulse required for the second telephone system is effected, in accordance with the present invention, so that after the setting of a selector to a trunk line leading to another telephone system, a voltage, applied to a line conductor (signal) already used for the signal transmission, energizes a change-over relay which is connected to such conductor in the storage device after the transmission of each train of current impulses.

A telephone system with individual storage devices for the seized connection paths at the beginning of the connection is shown by way of example in the figures. These storage devices are connected to the call-finder group-selectors which are coupled with each other. The invention however is not restricted to such arrangements; it can also be used for systems with central storage devices.

Figure 1B:
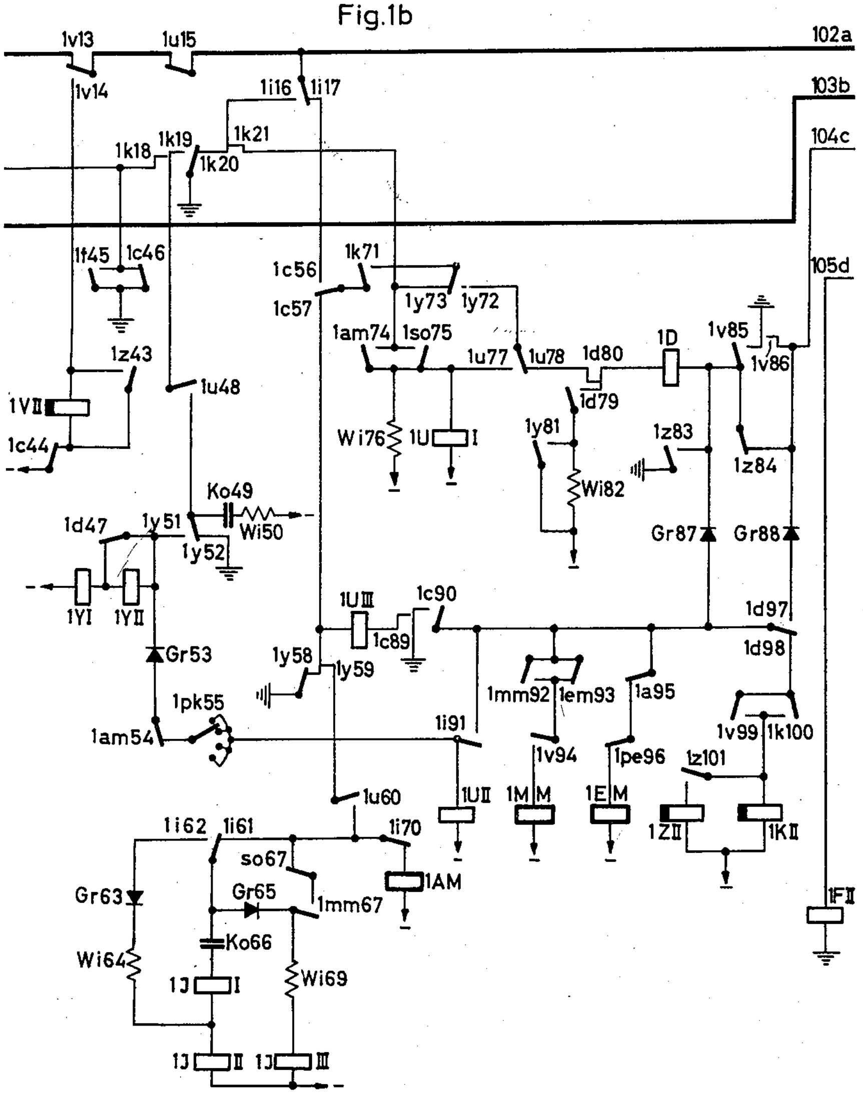
Figure 2A:
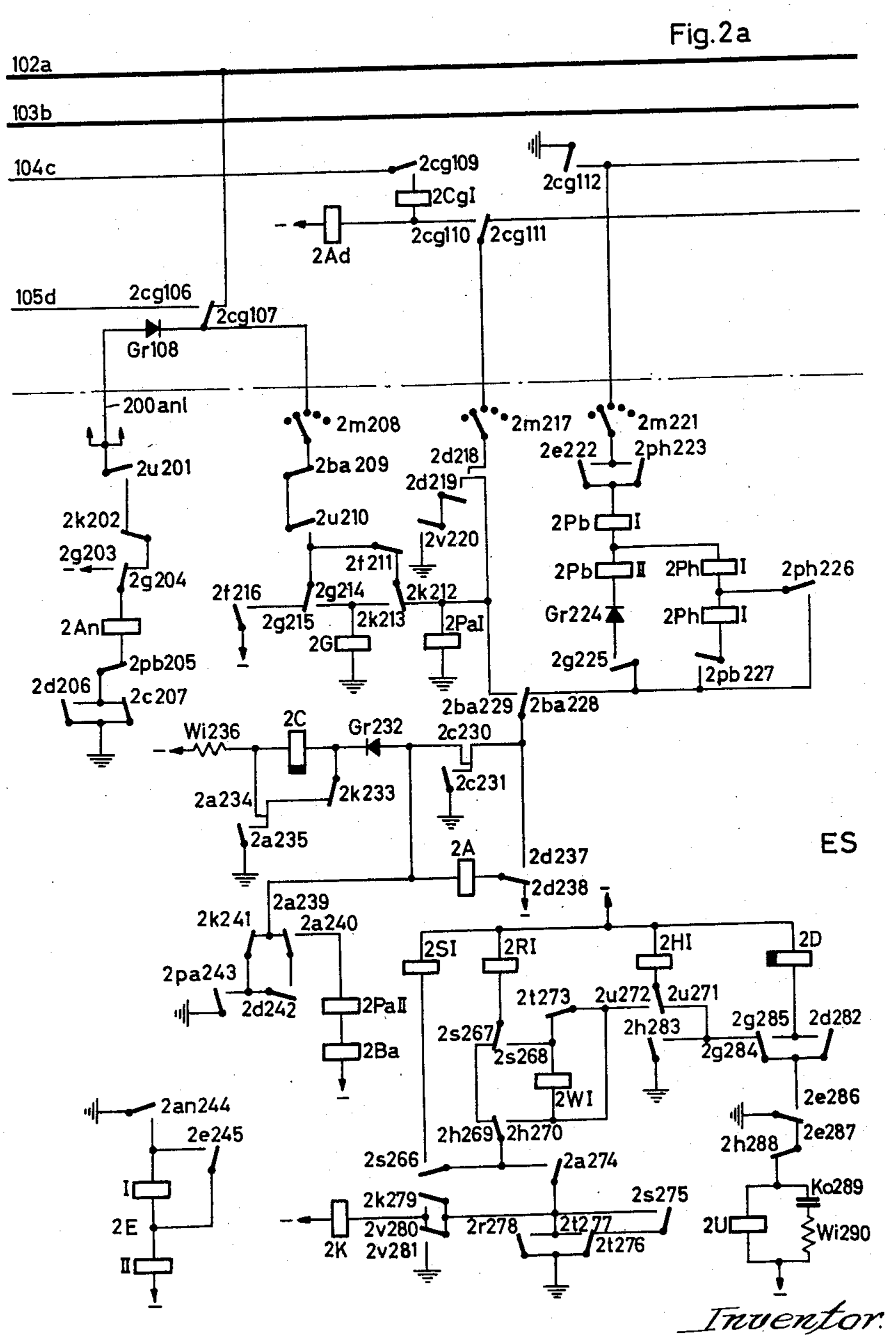
Figure 2B:
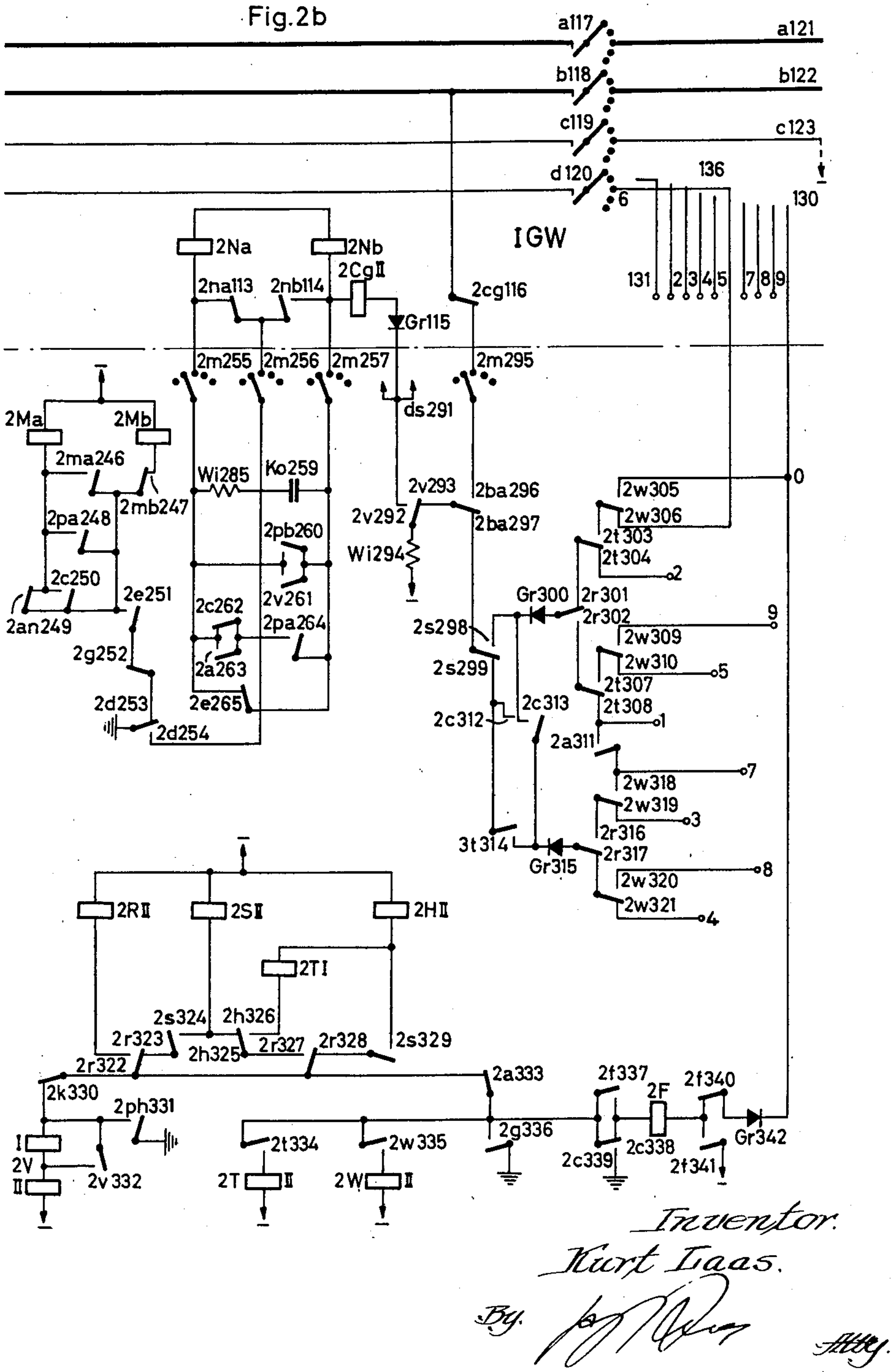
Figure 3:
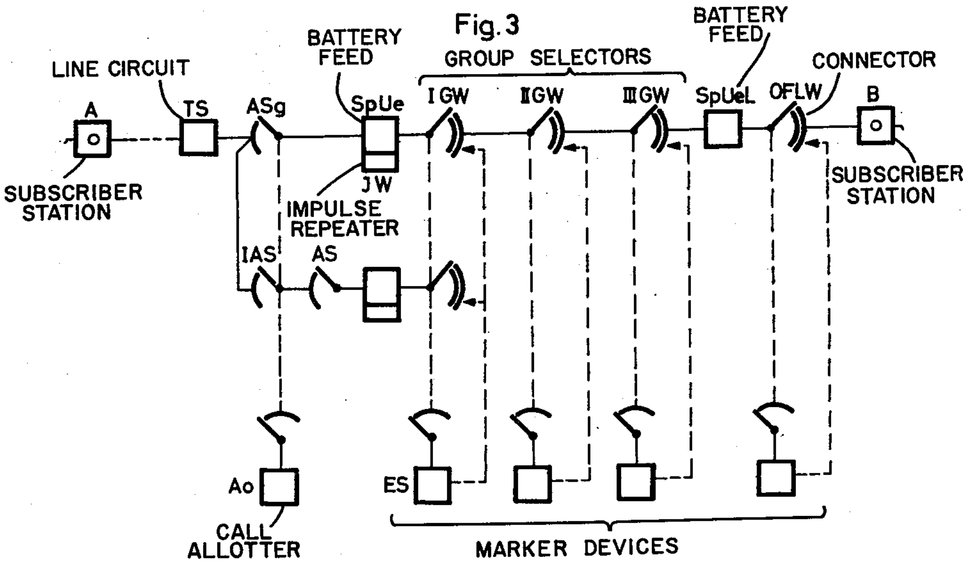

In the drawings, wherein like reference characters indicate like or corresponding parts:

FIGS. 1*a* and 1*b* illustrate the battery feed transmission for the calling subscriber and the storage device for storing trains of pulses transmitted by the subscriber;

FIGS. 2*a* and 2*b* illustrate the switching details for the marker and the first group selector; and FIG. 3 illustrates, in block form, a system embodying the present invention.

First of all, let us describe the telephone system in question with reference to the block diagram of FIGURE 3. The calling subscriber A is in customary manner connected to a two-conductor subscriber's line which terminates at the central exchange with a subscriber's line circuit TS. As soon as the calling subscriber picks up the receiver in order to make a call, his line is also in known manner connected by a call finder AS*g*. Of course a calling line can also be connected over two call-finder stages.

Central call allotters AO are associated in the customary manner with each call-finder stage. Each call finder, for instance the call finder AS*g* is connected with a first group selector IGW. In each of these connection paths of a call finder group selector set, there is inserted a battery feed transmission S*p*U*e* with an associated electromechanical storer JW, the latter hereinafter called the impulse repeater. The impulse repeater stores the train of number impulses received and delivers them without conversion. The circuit details of this arrangement are shown in FIGS. 1*a* and 1*b*. A marker device ES is by means of a connecting switch connected with a group of first group selectors. FIGS. 2*a* and 2*b* show the switching details for the marker and the first group selector. From the first group selector the call extends, if required over a second group selector IIGW, which again has a common marker, and over a third group selector IIIGW, which also has a common marker, and finally over a battery feed-transmission S*p*U*e*L to the connector OFLW. The connector also has a common marker associated with it.

The switching operations which occur for establishing a connection will now be described in detail with reference to FIGS. 1*a*, 1*b*, 2*a* and 2*b*, insofar as they are of importance for an understanding of the present invention.

FIGS. 1*a* and 1*b* show the battery feed transmission for the calling subscriber and the storage device for storing the train of pulses transmitted by the subscriber. The storage device may be of the type illustrated in U.S. Patent No. 2,737,648, issued to W. Lohs et al. on March 6, 1956, having laminations which are arranged in a circle and are pushed below a guide ring to storage position by a marker magnet, when the latter is in de-energized condition, corresponding to the number of pulses of a digit. In each case the intermediate laminations remain in unstoved position while the last lamination is pushed below said guide ring into storage position and thus characterizes the end of a train of pulses. If for instance a train of pulses consists of seven impulses, laminations 1 to 6 remain below the guide ring and lamination 7 is pushed below the guide ring. Upon the feeding out of a series of pulses from this storing device, a switch arm 1*pk*55 (FIG. 1*b*) is advanced stepwise and upon coming against a lamination which is below the guide ring, closes a circuit for a relay which thereby characterizes the end of a train of pulses. The storage device also has off normal contacts *so*67 and *so*75, which are actuated on departure from normal position. The contact 1*pe*96 is opened when the end position is reached, that is, when the storage device is completely filled and interrupts the further receipt of current impulses.

The storage and battery feed transmission shown in FIGS. 1*a* and 1*b* is seized by a preceding connecting device, a call-finder, over the private conductor *c*3 as follows:

(1) +, . . ., *c*3-conductor, 1*a*22, 1*v*27, 1AIII, 1*u*28, 1*k*29, 1*c*32, —

In this circuit, the relay 1A is energized and by opening its contact 1*a*22 opens the short circuit extending about the seizure relay 1C which is thereby inserted in the circuit 1 and energizes. Furthermore, the winding 1U*e*V of the transformer 1U*e* is connected over contact 1*a*39 to the dial tone WZ:

(2) +, 1U*e*V, 1*v*37, 1*d*38, 1*k*40, 1*a*39, WZ

The dial tone is transmitted inductively from the winding 1U*e*V to the windings 1U*e*I and 1U*e*II of the transformer and from there over the line conductors *a*1 and *b*2 to the calling subscriber so as to cause him to start dialing. After energization of relay 1C, the energization circuit for winding III of relay 1A is interrupted. Relay 1A is however held over its winding I and II and the subscriber loop in the following circuit:

(3) +, 1AII, *b*2-conductor, subscriber loop, *a*1-conductor, 1AI, 1*c*6, —

Over contact (center of FIG. 1*b*), ground potential is applied to the private conductor 104*c* leading to the succeeding connecting device:

(4) +, 1*c*90, G*r*87, 1*z*84, 104*c*-conductor, . . .

Responsive to the dial tone, the subscriber now transmits the first series of impulses which, let us say, consists of six impulses. In the battery feed transmission, the impulse receiving relay 1A deenergizes in a pulse-like manner. Upon the first deenergization of the relay 1A, due to the opening of the contact 1*a*23, relay 1V is connected over its winding I:

(5) +, . . ., *c*3-wire, 1*a*22, 1VI, 1*f*24, W*i*30, 1*c*31, —

By closing the contact 1*a*22, the seizure relay 1C is short-circuited, but is nevertheless held for a series of impulses, due to its delay in deenergizing. The seizure relay 1C, after the interruption of its initial energizing circuit, was held in the following circuit:

(6) +, . . . , *c*3-wire, 1C, 1*a*23, 1*f*24, W*i*30, 1*c*31, —

After energization of the relay V, the relay 1K (bottom right of FIG. 1*b*) is energized over contact 1*u*99 which relay is held over its contact 1*k*100, independently of contact 1*v*99 in the following circuit:

(7) +, 1*c*90, 1*d*98, 1*k*100, 1KII, —

Upon energization of relay 1K the dial tone WZ is disconnected by the opening of the contact 1*k*40 and preparation is made for the transmission of a busy signal BZ by the closing of the contact 1*k*41.

Upon the deenergization of the relay 1A, the storage magnet 1EM (bottom right in FIG. 1*b*) of the storage device is energized over contact 1*a*95 in the following circuit:

(8) +, 1*c*90, 1*a*95, 1*pe*96, 1EM, —

The storage magnet 1EM, which is after energization of the relay A deenergized, shifts the laminations one step further and as the marker magnet 1MM is deenergized, an indexing lamination will be moved into storage position. The off-normal contacts also are thereby actuated. Minus potential lies, over contact 1*so*75 in the following circuit on the outgoing line conductor *a*102:

(9)

$$-, \frac{1UI}{Wi76}, 1so75, 1y73, 1k71, 1c56, 1i17, 102a \text{ conductor} \ldots$$

The application of this voltage to the *a*102-conductor triggers the operation of a marker associated with the succeeding connecting device. The relay 1U receives current insufficient to effect its operation while the individual marker is being seized and therefore remains at normal. At the end of the first impulse, the pulse receiving relay 1A is again attracted and by opening its contact 1*a*22, again connects the seizure relay 1C (cf. circuit 6) and, over its contact 1*a*23, short-circuits the relay 1V which, however, due to its release delay, remains operated during a series of pulses. The opening of the contact 1*a*95 disconnects the storage magnet, 1EM, which magnet, after deenergizing, energizes the marker magnet 1MM over contact 1*em*93:

(10) +, 1*c*90, 1*em*93, 1*v*94, 1MM, —

The marker magnet 1MM holds itself energized independently of the contact 1*em*93 over its own contact 1*mm*92 which extends parallel thereto. After the second impulse the laminations are advanced by one further step. The first five laminations therefore remain in unstored position above the aforementioned guide ring. After the sixth pulse, the relay 1A remains energized so that relay 1V deenergizes with delay by the short-circuiting of its windings I by contact 1*a*23. After the deenergizing of relay V, the marker magnet 1MM is disconnected by the opening of the contact 1*v*94 so that the sixth lamination can be pushed underneath the guide ring to a storage position. This lamination therefore remains below the guide ring in stored position when the laminations are moved one further step responsive to the next train of pulses. The further trains of pulses which arrive are taken up by the storage device and stored in the same manner as already described.

As soon as one marker seizes the succeeding connecting device, the high ohmic starting relay of such marker which is connected to the 102*a* conductor is disconnected and an amplification of current is obtained over a low ohmic test relay so that the relay 1U in the storage device can energize over its winding I in accordance with circuit 9. Over contact 1*u*60 the storage-release magnet 1AM (bottom of FIG. 1*b*) and the pulse transmitting relay 1J are energized in the following circuits:

(11) +, 1*y*58, 1*y*59, 1*u*60, 1*i*70, 1AM, —

(12) +, 1*y*58, 1*y*59, 1*u*60, 1*i*61, G*r*65, W*i*69, 1JIII, —

The relay 1J can however not be actuated since it is counter-energized over its windings I and II by the charging current for the capacitor K*o*66:

(13) +, 1*y*58, 1*y*59, 1*u*60, 1*i*61, K*o*66, 1JI, 1JII, —

As soon as the capacitor K*o*66 is charged, relay 1J is actuated via its winding III and holds itself, due to the discharge current K*o*66 in the following circuit:

(14) +(*ko*66), G*r*65, W*i*69, 1*j*III, 1JII, 1JI, — (K*o*66)

The capacitor discharges further in the following circuit:

(15) +(K*o*66), 1*i*62, G*r*63, W*i*64, 1JI, —(K*o*66)

During the time of actuation of the relay 1J, voltage is disconnected from the conductor a102 by the opening of the contact 1i17 (see circuit 9) and a pulse is thus transmitted to the marker. The opening of the contact 1i70 also effects disconnection of storage release magnet 1AM, which magnet, after it has deenergized, prepares a test circuit for the test wiper pk55 of the storer selector switch by closing the contact 1am54:

(16) +, 1c90, 1i91, 1pk55, 1am54, Gr53, 1d47, 1YI, —

Since the first lamination is above the guide ring, this circuit is not closed, so that relay 1Y cannot energize. After the discharge of the capacitor Ko66, relay 1J deenergizes and by closing its contacts 1i17 again applies voltage to the 102a conductor (cf. circuit 9). Over contact 1i70, the storage-release magnet 1AM is again energized and the charging circuit for the capacitor Ko66 is again closed over contact 1i61. During the energization interval of relay 1J, relay 1U is held over its winding II in the following circuit (its holding circuit over winding I being interrupted by the opening of the contact 1i17):

(17) +, 1c90, 1i91, 1UII, —

During the transmission of the sixth pulse, the test wiper pk55 is on the index lamination located below the guide ring so that the energizing circuit for the relay 1Y (see circuit 16) is closed after the deenergization of the storage-release magnet 1AM. Relay 1Y actuates and holds itself, independently of its holding circuit, in the following circuit:

(18) +, 1k19 (top of FIG. 1b), 1u48, 1y51, 1d47, 1YI, —

By opening of contacts 1y58 and 1y59, ground potential is removed from the pulse transmitting relay 1J and the storage-release 1AM so that they can no longer energize. Over contact 1y72, relay 1U is held over its winding I in the following circuit:

(19) +, . . ., 102a-conductor, 1i17, 1c56, 1k71, 1y72, 1u77, 1UI, —

After the setting of the succeeding first group selector to an idle outgoing trunk line, ground potential is disconnected from the 102a conductor so that relay 1U deenergizes. After the deenergization of relay 1U, the holding circuit for relay 1Y (cf. circuit 18) is interrupted by the opening of the contact 1u48, but relay 1Y is held by the discharge current of the capacitor Ko49:

(20) +(Ko49), 1y51, 1d47, 1YI (minus line), Wi50, —(Ko49)

Furthermore, relay 1D is over contact 1u78 connected to the 102a conductor in the following circuit:

(21) +, 1c90, Gr87, 1D, 1d80, 1u78, 1y72, 1k71, 1c56, 1i17, 102a conductor, . . .

If the group selector has been set by the train of pulses transmitted thereto to connect with an outgoing connecting device which operates in accordance with the same technique as described (pulse-wise current interruption), no voltage is present therein on the 102a conductor; relay 1D cannot energize. However, if the connecting device reached is one which is set by ground current pulses, there will be negative potential on the 102a conductor, and relay 1D will energize.

By opening contact 1d38 (lower right of FIG. 1a), the prepared circuit for the busy signal is interrupted. Relay 1D maintains itself independently of the energizing circuit in the following holding circuit:

(22) +, 1c90, Gr87, 1D, 1d79, 1y81, —

By opening contact 1d47, the short-circuit for the winding II of the relay 1Y is interrupted, so that the relay 1Y deenergizes after discharge of the capacitor Ko49. Furthermore, by opening contact 1d98, relay 1K is disconnected (cf. circuit 7). After the deenergization of relay 1K relay 1U is, over contacts 1k20 and 1k21 of relay 1K, energized in the following circuit; via the contacts 1k20 and 1k21 of relay 1K:

(23) $+,\ 1k20,\ 1k21,\ 1so75,\ \frac{1UI}{Wi76}-$

The storage-release magnet 1AM (cf. current path 11) is energized over contact 1u60, and the pulse transmitting relay 1J is connected (cf. circuits 12 to 15). As soon as the wiper 1pk55 has reached the next marked or stored lamination, relay 1Y energizes (cf. circuit 16) and interrupts the further transmission of pulses. Relay 1Y is held by the discharge current of the capacitor Ko49 (cf. circuit 20) over its windings 1YI and 1YII and deenergizes with a very strong time delay. The closing of contacts 1y58 and 1y59 initiates the transmission of the next train of pulses.

During the time of energization of the pulse transmitting relay 1J, a ground pulse is sent out in each case over the 102a conductor, by the application of ground:

(24) +, 1k20, 1i16, 102a-conductor . . .

After the transmission of all trains of pulses relay 1U is disconnected by the opening of the normal contact 1so75.

If the relay 1D does not operate, relay 1Y deenergizes and over its contact 1y73 connects voltage to the 102a conductor (cf. circuit 9) so as to obtained a marker of the connecting device reached. After connection of a marker, the release of the stored trains of pulses is initiated as already described. When all digits have been released from the storage device, the normal contact 1so75 of the pulse repeater is interrupted and thus the start circuit for further markers is interrupted.

If the succeeding selector does not find any idle outgoing trunk line, then after the stopping of the selector at a full-rotation step, voltage is applied to the 103b conductor. The metering relay 1Z (top in FIG. 1a) is thereby energized via its winding I:

(25) +, 1k19 (top of FIG. 1b), 1k18, 1ZI, Dr12, 1UeIV, 103b-conductor . . ., —

By the opening of the contact 1z84, ground potential is removed from the 104c conductor (cf. circuit 4) and the succeeding connecting device is thereby released. Relay 1Z holds itself, independently of its energizing circuit, over its winding 1ZII (bottom right in FIG. 1b) in the following circuit:

(26) +, 1c90, 1d98, 1k100, 1z101, 1ZII, —

By closing the contact 1z42, busy signal BZ (bottom right in FIG. 1a) is connected to the winding V of the transformer 1Ue:

(27) +, 1UeV, 1v37, 1d38, 1k41, 1z42, busy signal BZ

From winding V, busy tone is inductively transmitted to the calling subscriber over the windings I and II of the transformer 1Ue. The busy signal causes the calling subscriber to release the connection by replacing the receiver.

Furthermore, when the selector stops at the full rotation step, the holding circuit for relay 1U (cf. circuit 19) is interrupted. After release of relay 1U, the holding circuit for relay 1Y (cf. current path 18) is opened by the opening of contact 1u48, relay 1Y however holding itself until the discharge of the capacitor Ko49 in accordance with circuit 20.

As soon as the calling subscriber has replaced his receiver, the holding circuit for windings I and II of relay 1A (cf. circuit 3) is interrupted. Relay 1A deenergizes and over its contact 1a22 short circuits the winding of the seizure relay 1C which is thereby caused to deenergize with delay. During the restoring time of relay 1C, relay 1V can energize in accordance with circuit 5. The closure of contact 1a95 effects connection of the storage magnet 1EM in accordance with the circuit 8. As soon as relay 1V is energized and the seizure relay 1C has restored, relay 1K is held independently of the holding circuit over its winding II (cf. circuit 7) over its winding I:

(28) +, . . ., c3-conductor, 1*a*22, 1*y*26, 1KI 1*c*32, —

After the delayed release of the seizure relay 1C, the holding circuit for relay 1V is interrupted by the opening of the contact 1*c*31 so that relay 1V deenergizes. The opening of contact 1*c*90 effects disconnection of relay 1Z and of the storage magnet 1EM. By the closure of contact 1*c*27, relay 1U is energized over its winding I in the following circuit:

(29) +, 1*y*58, 1*c*57, 1*k*71, 1*y*73, 1*so*75, $\frac{1UI}{Wi76}$, —

Relay 1U actuates and closes over its contact 1*u*60 the circuit 11 for energizing the storage-release magnet 1AM and the circuits 12 and 13 for the pulse transmitting relay 1J. Relay 1J actuates, after the capacitor K*o*66 has been charged and holds itself until discharge of this capacitor in accordance with circuits 14 and 15. In the meantime, relay 1V releases and by opening the contact 1*v*26, interrupts the holding circuit for relay 1K (cf. circuit 28). After the delayed release of relay 1K, relay 1U is held in the following circuit instead of circuit 29.

(30) +, 1*k*20, 1*k*21, 1*so*75, $\frac{1UI}{Wi76}$, —

Upon actuation of relay 1J, the storage-release magnet 1AM is disconnected by the opening of contact 1*i*70. As soon as relay 1J releases after the discharge of the capacitor K*o*66, the charging circuit for this capacitor is again closed by the closing of contact 1*i*61 and the storage-release magnet 1AM is again connected over contact 1*i*70. This interplay between the pulse transmitting relay 1J and the storage-release magnet 1AM continues until, after reaching the normal position of the storage device, the normal contact 1*so*75 is opened and the holding circuit for relay 1U (cf. circuit 30) is thereby interrupted.

Relay 1U is however held during the time of energization of the destorage magnet 1AM by the contact 1*am*74 which lies in parallel to contact 1*so*75. After the actuation of the pulse transmitting relay 1J, the storage-release magnet 1AM is disconnected by the opening of the contact 1*i*70, this magnet in its turn disconnecting relay 1U by the opening of contact 1*am*74. Relay 1U, by opening its contact 1*u*70, interrupts the energizing circuit for relay 1J and the storage-release magnet 1AM.

Furthermore, the seizure circuit for the battery feed transmission S*p*U*e* shown is prepared over contact 1*u*28 (cf. circuit 1). The battery feed transmission is thus again in normal condition and can again be seized in connection with another call.

If however no busy signal is transmitted from the succeeding connecting device, then, as already mentioned, after the release of the last impulse by the opening of the contact 1*so*75, the circuit for obtaining a further marker (cf. circuit 9) is interrupted.

If the connection is switched through to the subscriber line desired, and if the latter is idle, then during the release time of relay 1Y, voltage is applied to the 102*a* conductor by the succeeding connecting device so that relay 1D energizes in the circuit path 21. Relay 1D closes over its contact 1*d*80 a holding circuit for itself (cf. circuit 22). Ground is applied to the outgoing 104*c* conductor over contact 1*d*97 independent of circuit 4:

(31) +, 1*c*90, 1*d*97, G*r*88, *c*104 conductor, . . .

At the same time, due to the opening of the contact 1*d*98, the holding circuit for relay 1K (cf. circuit 7) is interrupted, so that relay 1K restores with time delay.

As soon as the called subscriber answers, voltage is applied to the 103*b* conductor by the succeeding connecting device (connector). No switching operations are thereby produced in the battery feed transmission, since the energizing circuit for relay 1Z is interrupted after the restoration of relay 1K (cf. circuit 25).

After completion of the conversation, the connection is released when the calling subscriber hangs up. The pulse receiving relay 1A restores (cf. circuit 3) due to the opening of the subscriber's loop. By closing the contact 1*a*22, the winding of the seizure relay 1C is short-circuited and such relay 1C is thereby caused to restore with time delay. At the same time, by the opening of the contact 1*a*23, relay IV (cf. circuit 5) is connected. The circuit for energizing the storage magnet 1EM (cf. circuit 8) is closed over contact 1*a*95. After actuation of relay IV, relay 1D is held, independently of circuit 22 in the following circuit:

(32) +, 1*v*85, 1D, 1*d*79, W*i*82, —

Ground is applied to the outgoing 104*c* conductor independently of circuit 31 via contact 1*v*86.

(33) +, 1*v*86, 104*c* conductor, . . .

After the delayed release of the seizure relay 1C, the circuit for the storage magnet 1EM is interrupted by the opening of the contact 1*c*90 so that the storage magnet restores. At the same time the holding circuit for relay 1D (cf. circuit 22) is interrupted, but relay 1D continues to hold itself in accordance with the circuit 32. After the opening of contact 1*c*90, ground potential would be removed from the 104*c* conductor if it were not connected in accordance with circuit 33 over contact 1*v*86 in order to prevent release of the connection until the metering pulse has been transmitted. After the closing of contact 1*c*32, relay 1K can energize over its winding I in the circuit 28. A circuit for winding I of the metering relay 1Z is closed over contact 1*c*46:

(34) +, 1*c*46, 1ZI, D*r*12, 1UIV, *b*103 conductor, . . .

Finally, after the release of relay 1C, the holding circuit for relay 1V (cf. circuit 5) is interrupted, by the opening of the contact 1*c*31, so that relay 1V restores with time delay. After energization of relay 1K, relay 1U is connected in accordance with circuit 29 by the closing of contact 1*k*71. Relay 1Z, by closing its contact 1*z*36, applies voltage to the *z*5 conductor:

(35) —, 1*z*36, 1*d*35, *z*5 conductor, . . .

After the energization of relay 1U the storage-release magnet 1AM and the pulse transmitting relay 1J are connected over contact 1*u*60. There now take place exactly the same switching operations as already described in connection with the release after transmission of the busy signal. After the delayed release of relay 1V, the holding circuit for relay 1D (cf. circuit 35) is interrupted. At the same time, by the opening of contact 1*v*86, ground is removed from the outgoing 104*c* conductor. The succeeding connecting devices are in this manner released. As a result of the release of the succeeding connecting device, the voltage lying on the 103*b* conductor is disconnected and the metering relay 1Z releases (cf. circuit 34). It may be mentioned here that the relay 1D after energization of the metering relay 1Z was held over contact 1*z*83, so that relay 1D after the release of relay 1Z and consequent opening of contact 1*z*83 also releases. The transmission of the metering impulse is terminated by the opening of contact 1*z*36. As soon as relay 1D is released, relay 1K is caused to release by the opening of contact 1*d*25 over which, after the opening of contact 1*v*26, the holding circuit for winding I of relay 1K was maintained (cf. circuit 28). After relay 1K has restored, the seizure circuit (cf. circuit 1) is again prepared over contact 1$k$29 and the battery feed transmission and impulse storage device can again be seized in connection with a subsequent call.

It may also be mentioned here that in case of long-distance calls, the long-distance marking relay 1F (bottom right in FIG. 1$b$) is caused to energize over its winding II and the 105$d$ conductor. Independently of this energizing circuit, it holds itself by connecting its winding I (center of FIG. 1$a$) after the opening of contact 1$f$24 over the incoming $c$3 conductor. By closing contact 1$f$33, the calling subscriber line is marked as being occupied with a long-distance call by direct application of ground potential to the $d$4 conductor. Furthermore, a circuit for the metering relay 1Z is closed via contact 1$f$45 (near top of FIG. 1$b$). The metering current pulses are transmitted during the conversation by the application of voltage to the 103$b$ conductor, so that relay 1Z can energize and transfer these metering pulses in circuit 35 to the charge meter of the calling subscriber. The release at the end of the conversation is the same as already described in connection with a connection to a subscriber of the same local network.

FIGS. 2$a$ and 2$b$ show the first group selector and the central marker ES belonging to the first group selector. With the marker in normal position, the supervisory relay 2U (bottom right in FIG. 2$a$) is energized in the following circuit:

(101) +, 2$e$287, 2$h$288, 2U, −

This circuit interrupted during the setting operation of the group selector, but the supervisory relay 2U remains energized by the discharge current of the capacitor K$o$289. It releases only when the circuit is interrupted for an extended interval by a disturbance in the marker.

By the application of voltage to the 102$a$ conductor from the seized preceding battery feed transmission (FIG. 1, circuit 9), the marker is caused to connect itself with the group selector. The starting relay 2A$n$ energizes in the following circuit:

(102)

+, 2$c$207, 2$pb$205, 2A$n$, 2$g$204, 2$k$202, 2$u$201, 200$an$1-conductor, G$r$108, 2$cg$107, 102$a$ conductor, . . ., —

Voltage is applied to the 102$a$ conductor in the preceding connecting device (cf. circuit 9). The starting relay 2A$n$ by closing its contact 2$an$244 connects relay 2E (bottom left in FIG. 2$a$) which is held in the following circuit:

(103) +, 2$an$244, 2$e$245, 2EII, −

The closing of contact 2$e$251 effects starting of the connecting switch which is a motor switch. The wipers of such switch are driven by two field coils 2M$a$ and 2M$b$ (left center in FIG. 2$b$) displaced by 90°, at the intersection of the axes of which there is rotatably supported an unwound armature which is rotated by the magnetic fields produced alternately in the field coils. The rotary motion of the armature is transmitted by a gearing to the switch shaft and thus to the wipers 2$m$208—2$m$295 fastened thereto. By the cam contacts 2$ma$246 and 2$mb$247 controlled by the armature shaft, the field coils are alternately operatively connected. Simultaneous energization of both field coils places a braking force on the armature to stop further rotation of the wipers. In the position of the contacts shown, the field coil 2M$b$ is energized upon the closing of the contact 2$e$251:

(104)

+, 2$d$253, 2$g$252, 2$e$251, 2$mb$247, 2M$b$, —

By the magnetic field produced by the field coil 2M$b$, the armature is attracted and thereby placed in rotation. The cam contact 2$mb$247 is opened and the cam contact 2$ma$246 closed, so that the field coil 2M$a$ is now excited:

(105)

+, 2$d$253, 2$g$252, 2$e$251, 2$ma$246, 2M$a$, —

As soon as the armature is attracted by the magnet coil 2M$a$, the cam contact 2$mb$247 is closed and the cam contact 2$ma$246 opened, so that now again the field coil 2M$b$ is traversed by current and in its turn again attracts the armature of the motor switch. As soon as the test wiper 2$m$208 of the connecting switch reaches the contact (extending to the group selector) to which the preceding battery feed transmission is connected which initiated the operation of the marker, the test relay 2P$a$ is energized over its winding I in the following circuit:

(106)

+, 2P$a$I (center of Fig. 2$a$), 2$k$212, 2$f$211, 2$u$210, 2$ba$209, 2$m$208 - wiper, 2$cg$107, 102$a$ - conductor, . . ., —

As already mentioned, voltage lies on the 102$a$ conductor in the preceding connecting device (cf. circuit 9) so that the test relay 2P$a$ can energize and by closing its contact 2$pa$248 stop rotation of the wipers simultaneous excitation of the two field coils 2M$a$ and 2M$b$. The field coil 2M$b$ is energized in accordance with circuit 104 and the field coil 2M$a$ in the following circuit:

(107)

+, 2$d$253, 2$g$252, 2$e$251, 2$pa$248, 2M$a$, —

Furthermore, by the closing of contact 2$pa$243, relay 2A (lower center of FIG. 2a) is energized:

(108) +, 2$pa$243, 2$k$241, 2A, 2$d$238, —

Relay 2A, by opening its contact 2$a$234, interrupts the short circuit for relay 2C and connects the latter over contact 2$a$235:

(109) +, 2$a$235, 2$k$233, 2C, W$i$236, —

Relay 2C closes its contact 2$c$250 and thus maintains the simultaneous energization of the two field coils of the connecting switch independently of the contact 2$pa$248. The holding circuit for the starting relay 2A$n$ (cf. circuit 102) is interrupted by the opening of contact 2$c$207. The starting relay 2A$n$ releases and, by opening the contact 2$an$244 disconnects relay 2E (bottom left in FIG. 2$a$) which, due to the short circuiting of its winding I over contact 2$e$245, releases with delay and by opening the contact 2$e$251, disconnects the energization circuit of the two field coils 2M$a$ and 2M$b$ (left center of FIG. 2$b$) of the motor switch.

By connecting the low ohmic test relay 2P$a$ in parallel to the high ohmic starting relay 2A$n$, the current flowing to the preceding connecting device is increased, serving as a signal for the release of the first train of pulses stored in the preceding connecting device. The current pulses are transmitted as impulse-wise interruptions, that is, disconnection of the voltage lying on the 102$a$ conductor over circuit 9, so that upon each pulse the test relay 2P$a$, which thus also operates as pulse receiving relay, deenergizes. When the test relay 2P$a$ first releases, the circuit for relay 2A (center of FIG. 2$a$) is interrupted by the opening of contact 2$pa$243 so that relay 2A also releases. By the opening of the contact 2$a$235, relay 2C is disconnected which relay, however, due to its slow release characteristic, reinforced by the short-circuiting of its energizing winding over contact 2$a$234, remains attracted during the transmission of the pulses. By the closing of contact 2$a$333, relay 2V (bottom left in FIG. 2$b$) is connected over its windings I and II and this relay, after it has energized, is held in the following circuit:

(110)

+, 2$c$339, 2$a$333, 2$k$330, 2$v$332, 2VII, —

Due to short-circuiting of winding I of relay 2V over contact 2$v$332, relay 2V remains actuated during the transmission of the train of pulses. At the end of the first pulse, 2P$a$ is actuated and again connects relay 2A (cf. circuit 108). Over contact 2$a$235, relay 2C is again connected, while by the opening of contact 2*a*333, the circuit for relay 2V is interrupted. By the closing of contact 2*a*274, relay 2R is connected over its winding I:

(111) +, 2*v*281, 2*a*274, 2*h*269, 2*s*267, 2RI, —

It may be mentioned here that the relays 2H, 2R, 2S, 2T and 2W are stepped as counting chain relays by the incoming pulses and by their contacts, in the form of a contact pyramid, mark the selected decade onto which the group selector is to be set. At the beginning of the second pulse and after the release of relay 2A, relay 2S is connected by way of contact 2*a*333:

(112) +, 2*c*339, 2*a*333, 2*r*327, 2*h*325, 2SRII, —

Relay 2R is held over its winding II:

(113) +, 2*c*339, 2*a*333, 2*r*322, 2RII, —

When at the end of the second pulse relay 2A is again actuated, relay 2S is held over its winding I:

(114) +, 2*v*281, 2*a*274, 2*s*266, 2SI, —

The energizing circuit for relay 2R (cf. circuit 111) is interrupted by the opening of contact 2*s*267. Upon the arrival of the third pulse, relay 2A again releases. Relay 2S is held by way of contact 2*a*333:

(115) +, 2*c*339, 2*a*333, 2*r*323, 2*s*324, 2SII, — and relay 2H is connected by way of contact 2*s*329:

(116) +, 2*c*339, 2*a*333, 2*r*328, 2*s*329, 2HII, —

When at the end of the third pulse relay 2A is again actuated, relay 2S is held in accordance with circuit 114 while relay 2H is held in the following circuit:

(117) +, 2*v*281, 2*a*274, 2*h*270, 2*u*272, 2HI, —

Furthermore, relay 2R is connected in the following circuit:

(118) +, 2*v*281, 2*a*274, 2*h*270, 2*t*273, 2*s*268, 2RI, —

Upon arrival of the fourth pulse, relay 2A again releases and by closing its contact 2*a*333, holds relay 2*r* (cf. circuit 113) and relay 2H. In the holding circuit for relay 2H, there is connected winding I of relay 2T so that this relay is also energized:

(119) +, 2*c*339, 2*a*333, 2*r*327, 2*h*326, 2TI, 2HII, —

Relay 2T is held in the following circuit independently of this energizing circuit:

(129) +, 2*c*339, 2*t*334, 2TII, —

At the end of the impulse, the holding circuit for relay 2R is interrupted by the opening of contact 2*a*333. Relay 2H is held via contact 2*a*274 (cf. circuit 117). As soon as relay 2A restores again upon the arrival of the fifth impulse, the holding circuit for relay 2H is also interrupted by the opening of contact 2*a*274 so that now relay 2T (cf. circuit 120) is energized. At the end of the pulse, relay 2R is energized over contact 2*a*274 (cf. circuit 111). Upon the restoration of relay 2A during the sixth impulse, relay 2R is held over circuit 113 and relay 2S is connected over circuit 112. At the end of the sixth impulse, relay 2S is held in accordance with circuit 114 and relay 2R restores. Since no further pulses arrive, the holding circuit for relay 2V (cf. circuit 110) remains interrupted, so that relay 2V releases with delayed action. After the release of relay 2V, relay 2K is connected over contact 2*v*280:

(121) +, 2*t*277, 2*v*280, 2K, —

After energization, relay 2K is held, independently of contact 2*v*280, by way of contact 2*k*979 parallel to the latter. By the opening of contact 2*k*212, relay 2P*a* is disconnected (cf. circuit 106) and relay 2G is connected:

(122) +, 2G, 2*k*213, 2*f*211, 2*u*210, 2*ba*209, 2*m*208-arm, 2*cg*107, 102*a*-wire, . . . , —

As already repeatedly mentioned, voltage is present on the 102*a* conductor in the preceding connecting device (cf. circuit 9), so that relay 2G can energize. Furthermore, upon actuation of relay 2K, relay 2A is disconnected by the opening of contact 2*k*241, while relay 2C is disconnected by the opening of contact 2*k*233. Relay 2C, due to its short circuit winding, restores with time delay. Upon the release of relay 2A, relay 2S is held in the circuit 115 and relay 2H is connected via its winding II in accordance with circuit 116. The first step of the decade 6 is marked by way of contacts 2*s*298, 2*r*301, 2*t*303 and 2*w*306 of the contact pyramid.

Upon actuation of relay 2G, the contact 2*g*336 lying parallel to contact 2*c*339 is closed, so that relays 2T, 2S and 2H are held, despite the release of relay 2C and the opening of contact 2*c*339. After the delayed release of relay 2C, the starting relay 2A*n* is again connected by way of contact 2*c*207:

(123) +, 2*c*207, 2*pb*205, 2A*n*, 2*g*203, —

If instead of the digit 6, the digit 0 had been dialed, which digit signifies a long-distance call, then after the release of relay 2C, relay 2F which marks the long distance call will be energized in the following circuit:

(124) +, 2*g*336, 2*c*338, 2F, 2*f*340, G*r*342, 2*w*305, 2*t*303, 2*r*301, G*r*300, 2*s*298, 2*ba*297, 2*v*293, W*i*294, —

Relay 2F is thereupon held in the following holding circuit:

(125) +, 2*g*336, 2*f*337, 2F, 2*f*341, —

The further switching operations initiated by the actuation of relay 2F will not be considered at this point.

By the energization of relay 2A*n* (cf. circuit 123) relay 2E is connected by way of contact 2*an*244 and is held in accordance with circuit 103. The field coils 2M*a* and 2M*b* of the motor switch despite the closing of the contact 2*e*251 are not energized, since their circuits are interrupted by the opening of contact 2*g*252. By the closing of contact 2*e*286, relay 2D is connected:

(126) +, 2*e*286, 2*g*285, 2D, —

Relay 2D after its actuation closes the contact 2*d*206 lying parallel to contact 2*c*207, so that the starting relay 2A*n* after renewed actuation of relay 2C is held by way of this contact. The field coils 2N*a* and 2N*b* (near top of FIG. 2*b*) of the group selector IGW are connected over contact 2*d*254, these coils being alternately energized by way of the cam contacts 2*na*113 and 2*nb*114. In the illustrated position of the cam contacts, the field coil 2N*a* is energized in the following circuit:

(127) +, 2*d*254, 2*m*256-arm, 2*na*113, 2N*a*, —

After attraction of the armature by field coil 2N*a*, the cam contact 2*na*113 is opened and the cam contact 2*nb*114 is closed, so that the field coil 2N*b* is now energized:

(128) +, 2*d*254, 2*m*256-wiper, 2*nb*114, 2N*b*, —

As soon as the wiper *d*120 of the group selector has reached the first step of the sixth decade, the test relay 2P*a* is energized over its winding I and stops the motor selector:

(129) +, 2P*a*I, 2*d*218, 2*n*217-wiper, 2*cg*111, *d*120-arm, 136-wire, 2*w*306, 2*t*303, 2*r*301, G*r*300, 2*s*298, 2*ba*297, 2*v*293, W*i*294, —

The two field coils 2N*a*, 2N*b* are connected with each other over contact 2*pa*264 in the marker and thus simultaneously energized so that the selector is stopped with its wipers at the first step:

(130) 2N*b*, 2*m*257-wiper, 2*pa*264, 2*c*262, 2*n*255-wiper, 2N*a*

Furthermore, upon energization of relay 2P*a* over contact 2*pa*243, relay 2C is connected:

(131) +, 2*pa*243, 2*d*242, 2*a*239, G*r*232, 2C, W*i*236, —

At the same time a circuit for the test relay 2P*b* is closed over contact 2*pa*243:

(132) +, 2*pa*243, 2*d*242, 2*a*239, 2*c*230, 2*ba*228, 2*g*225, G*r*224, 2P*b*II, 2P*b*I, 2*e*222, 2*m*221-wiper, *c*119-wiper, *c*123-conductor, . . .

This circuit is opened upon energization of relay 2C and the following circuit for the test relay 2P*b* is closed by way of contact 2*c*231:

(133) +, 2*c*231, 2*ba*228, 2*g*225, G*r*224, 2P*b*II, 2P*b*I, 2*e*222, 2*m*221-wiper, *c*119-wiper, *c*123-conductor, . . . , —

If the succeeding connecting device which is connected to the first step is idle, the wiper *c*119 encounters voltage and the test relay 2P*b* can energize in accordance with circuit 132. If however the first step is occupied, then after actuation of relay 2C, by the opening of contact 2*c*262, the simultaneous energization of the two field coils 2N*a* and 2N*b* will be interrupted (cf. circuit 130) so that the selector wipers are moved further by the alternate energization of the two field coils. The selector thus hunts in the marked decade until it finds an idle line; if all lines are busy, it comes to the first contact of the next following decade as over-run ("eleventh step") position. After its wipers have left the first step, the holding circuit for the test relay 2P*a* is interrupted so that this relay deenergizes. By the opening of contact 2*pa*243, the short circuit for relay 2A is interrupted so that it can again energize in series with relay 2C:

(134) +, 2*c*231, 2*d*237, 2A, G*r*232, 2C, W*i*236, —

Furthermore, by the opening of contact 2*pa*264, after actuation of relay 2A, a circuit is prepared for the stopping of the motor selector upon reaching full rotation (11th) step.

By the actuation of relay 2A, the counting relay chain for the marking of the decades is stepped further, that is, the marking line of the next decade is connected. Before energization of relay 2A, the relays 2S and 2T were held in the circuits 115 and 120. The holding circuit for relay 2S is interrupted by the opening of contact 2*a*333. Relay 2S is however held over its winding I in the circuit 114. Furthermore, after the closing of contact 2*a*274, relay 2R again energizes in the following circuit:

(135) +, 2*t*277, 2*a*274, 2*h*270, 2WI, 2*s*268, 2RI, —

The first step of the seventh decade is marked by way of contacts of this relay:

(136) —, W*i*294, 2*v*293, 2*ba*297, 2*s*298, 2*c*313, G*r*315, 2*r*316, 2*w*318 (first step of the seventh decade)

The first step of the seventh decade is marked in order to stop the selector at this step, provided that all outlets of the sixth decade are busy. If the selector is stopped at this step, a switching criterion is for this purpose released by means of the relay 2B*a*, which causes the transmission of a busy signal to the subscriber.

However, as soon as the selector tests an idle succeeding connecting device, the test relay 2P*b* is energized in accordance with the circuit 132 and by opening its contact 2*pb*205, disconnects the starting relay 2A*n* (cf. circuit 123). By closing contact 2*pb*260, both field coils 2N*a* and 2N*b* are connected with each other and thus simultaneously energized so that the selector is stopped at the step reached. By closing the contact 2*pb*227, the auxiliary test relay 2P*h* is connected in parallel to the winding II of test relay 2P*b* in circuit 133 and is energized. After closing its contacts 2*ph*223 and 2*ph*226, the test relay 2P*b* and the auxiliary test relay 2P*h* hold themselves in the following circuit:

(137) +, 2*c*231, 2*ba*228, 2*ph*226, 2P*h*I, 2P*b*I, 2*ph*223, 2*m*221-wiper, *c*119-wiper, *c*123-conductor, . . . , —

By the closing of contact 2*ph*331, relay 2V is connected by way of its windings I and II and, after the closing of its contact 2*v*332, holds itself over its winding II in the following circuit:

(138) +, 2*ph*331, 2*v*332, 2VII, —

Upon restoration of the starting relay 2A*n*, the relay 2E is also disconnected, this relay releasing with delayed action due to the short-circuiting of its winding I. Upon closing of the contact 2*v*292, the seizure relay 2C*g* of the first group selector is energized:

(139) +, 2*d*254, 2*m*256-wiper, 2*nb*114, 2C*g*II, G*r*115, *ds*291 conductor, 2*v*292, W*i*294, —

If however cam contact 2*nb*113 is closed rather than cam contact 2*nb*114, as assumed in this circuit, a circuit will be closed for the energization of relay 2C*g* over this cam contact and contact 2*v*261.

After actuation of relay 2C*g*, the line wiper connecting contact magnet 2A*d* (top of FIG. 2*a*) of the group selector is energized by the closing of contact 2*cg*110:

(140) +, 2*v*220, 2*d*219, 2*d*218, 2*m*217, 2*cg*110, 2A*d*, —

Furthermore, by the opening of contact 2*cg*107, the holding circuit for relay 2G (cf. circuit 122) is interrupted and by the closing of contact 2*cg*106, the transmission of a criterion signifying the long-distance call is prepared by applying negative voltage to the 105*d* conductor. The opening contact 2*cg*116 prevents the transmission of the busy criterion by applying voltage to the 103*b* conductor. The test relays 2P*b* and 2P*h* are short-circuited over contact 2*cg*112 and thereby caused to deenergize. Upon release of relay 2G, voltage is upon making a long-distance connection applied to the 105*d* conductor over contact 2*g*215:

(141) —, 2*f*216, 2*g*215, 2*u*210, 2*ba*209, 2*m*208-wiper, 2*cg*106, conductor 105*d* . . .

This long-distance criterion effects energization of a relay 1F in the preceding connecting device (FIGS. 1*a* and 1*b*) over the conductor 105*d*, contact 1*f*33 of such relay marking the subscriber line as "busy with long distance call" as described before.

After release of test relay 2P*b* and of the auxiliary test relay 2P*h* of the marker, relay 2V is disconnected over contact 2*ph*331 (cf. circuit 138) which relay, due to the short-circuiting of its winding I over contact 2*v*332 restores with time delay. During the restoration of relay 2V, relay 2D deenergizes, this relay having been disconnected upon the release of relay 2E by the opening of the contact 2*e*286. By the opening of contact 2*d*218, the energization circuit for the line wiper connect magnet 2A*d* is interrupted, such magnet being held in series with the winding I of the seizure relay 2C*g* over the 104*c* conductor of the preceding connecting device:

(142) +, . . ., 104*c*-conductor, 2*cg*109, 2C*g*I, 2A*d*, —

By the opening of contact 2*d*237, the holding circuit for relays 2A and 2C (cf. circuit 134) is furthermore opened, so that both restore. The field coils 2N*a* and 2N*b* are disconnected by the opening of the contact 2*d*254. Likewise, by the opening of contact 2*d*254, the energizing circuit for the seizure relay 2C*g* is interrupted, which relay however, as already mentioned, is held in accordance with circuit 142 for the battery feed transmission. As soon as relay 2C restores, the relay 2F which marks the long-distance call and the still energized relays of the relay counting chain are disconnected. After the delayed release of relay 1V, the holding circuit for relay 2K is interrupted by the opening of contact 2*v*281, so that such relay restores and by closing contact 2*k*202 closes the triggering line 200*an*1 for the starting relay 2A*n*. The marker is thus, after the release of relay 2K, again ready to be seized for another call.

If all lines of the sixth decade are busy, the testing relay 2P*b* cannot energize. The selector wipers are however stopped on the first step of the succeeding seventh decade by energization of the test relay 2P*a* in the following circuit:

(143)

+, 2P*a*I, 2*d*218, 2*m*217-wiper, 2*cg*111, *d*120-wiper, 137-conductor, 2*w*318, 2*r*316, G*r*315, 2*c*313, 2*s*298, 2*ba*297, 2*v*293, W*i*294, —

The two field coils 2N*a*, 2N*b* are responsive to closing of contact 2*pa*264 interconnected and the selector is stopped by simultaneous energization of these two field coils. By the closing of contact 2*pa*243, relay 2B*a* is energized:

(144) +, 2*pa*243, 2*d*242, 2*a*240, 2P*a*II, 2B*a*, —

By the closing of contact 2*ba*296, voltage is connected as busy criterion to the 103*b* conductor:

(145) —, W*i*294, 2*v*293, 2*ba*296, 2*m*295-wiper, 2*cg*116, 103*b*-conductor . . .

In the preceding battery feed transmission, the transmission of a busy signal to the calling subscriber is released by this busy criterion as already explained. The energizing circuit of test relay 2P*a* (cf. circuit 143) is interrupted by the opening of contact 2*ba*297 while at the same time winding I of test relay 2P*a* is short-circuited over contact 2*ba*229. The test relay, however, does not restore since it is held, over its winding II in the circuit 144. Furthermore, by the opening of contact 2*ba*209, relay 2G (cf. circuit 122) is disconnected. Relay 2G, by opening its contact 2*g*204 disconnects the starting relay 2A*n* which in its turn causes relay 2E to restore with time delay. After the restoration of relay 2E, relay 2D is disconnected by the opening of contact 2*e*286. After the delayed release of relay 2D, the relays 2C and 2A restore, as already mentioned. Furtherfore, the relays 2P*a* and 2B*a* are disconnected by the opening of contact 2*d*242. After the release of relay 2B*a*, the transmission of the busy criterion (cf. circuit 145) is terminated. After the release of relay 2C, the relays of the relay counting chain restore, causing disconnection of relay 2K. The marker is after the release of relay 2K again in normal position and can again be seized.

The release of the first group selector is effected by disconnecting ground potential from conductor 104*c* in the battery feed transmission. As a result, the seizure relay 2C*g* and the line wiper control magnet 2A*d* deenergize.

The setting of the further selection stages, such as second and third group selectors, is effected in a similar manner to the setting of the first group selector. It is not essential for an understanding of the invention and description thereof is therefore omitted. Explanations as to the setting of the connector to the desired subscriber line are omitted for similar reasons.

Changes may be made within the scope and spirit of the appended claims which define what is believed to be new and desired to have protected by Letters Patent.

I claim:

1. A circuit arrangement for a telephone system having impulse responsive selection switches disposed at successive selection stages, and having marker devices for said selection stages which are respectively common to the selection switches disposed in the corresponding selection stages, for controlling the operation of the selection switches in the respective selection stages, and having connecting switches for connecting the respective marker devices for operation with the corresponding selection switches, and further having impulse storage means and means for connecting such storage means to the calling end of a connection path involved in extending a call, for receiving numerical impulse series transmitted from a calling subscriber's station, said circuit arrangement comprising means for extending, over one and the same conductor of the connection path involved in the extension of a call, first, a start signal from the storage device for triggering the operation of the respective connecting switches to effect connection of the respective marker devices with the connection path involved in the call and therewith the storage device at the calling end of the involved connection path, second, extending to said storage device testing circuit means from the marker which had been connected to said connection path, and third, extending over the same conductor selection impulse series transmitted from said storage device to the respective markers.

2. A circuit arrangement according to claim 1, comprising switching means respectively disposed in the storage device and in the respective marker devices, said switching means being operative for successively offering one line conductor of the involved connection path first to the switching means controlling the start trigger signal, second, to the testing relay of the connecting switch which connects the respective marker device, and third, to the circuit extending between the storage device and the respective marker device.

3. A circuit arrangement according to claim 2, comprising switching means disposed in the respective marker device for subsequently connecting the testing relay, which operated in a circuit extending over said line conductor to stop the operation of said connecting switch, for receiving the numerical impulse series released from said storage device.

4. A circuit arrangement according to claim 3, comprising a relay chain for counting impulses, said testing relay being operative to receive and to transmit said impulse series to said counting chain, a plurality of auxiliary relays disposed in the marker device for thereafter connecting said testing relay to operate as a testing relay in the marking circuit of a selection switch which is to be set by the marking device.

5. A circuit arrangement according to claim 1, comprising a trunk line extending from a group selector to another telephone system requiring transmission of ground impulses thereover, said trunk line comprising a line conductor employed as a signal conductor, a switch-over relay disposed in said storage device, means effective after seizure of said trunk line by said group selector for connecting said switch-over relay to said signal conductor after transmission of each impulse series, and means for connecting a voltage to said signal conductor for energizing said switch-over relay.

6. A circuit arrangement according to claim 5, comprising an impulse transmitter, a marking relay, means responsive to energization of said switch-over relay for disconnecting said marking relay, contact means opened by said marking relay upon disconnection thereof for disconnecting from said signal conductor a voltage serving for starting the operation of said marker device, and contact means simultaneously closed by said marking relay for connecting ground potential to a make contact of said impulse transmitter.

7. A circuit arrangement according to claim 6, comprising a circuit including a contact controlled by said marking relay for initially energizing said switch-over relay, a circuit for holding said switch-over relay including a contact controlled thereby for maintaining said switch-over relay energized after disconnection of said marker relay, a control relay for controlling the release of stored impulse series, and contact means controlled by said marker relay upon disconnection thereof for operatively connecting said control relay.

8. A circuit arrangement according to claim 7, comprising an impulse transmitting relay forming part of said impulse transmitter, contact means controlled by said control relay for operatively connecting said impulse transmitting relay, a further control relay, means for energizing said further control relay at the conclusion of transmission of each impulse series, and contact means governed by said further control relay for interrupting the circuit of said impulse transmitting relay.

9. A circuit arrangement according to claim 8, comprising a capacitor for determining by its discharge time the energization interval of said further control relay at the conclusion of each impulse series, thereby determining the pause between successive impulse series.

No references cited.